(12) United States Patent
Nishino et al.

(10) Patent No.: US 8,187,748 B2
(45) Date of Patent: *May 29, 2012

(54) NON-AQUEOUS ELECTROLYTE SECONDARY BATTERY

(75) Inventors: Hajime Nishino, Nara (JP); Shinji Kasamatsu, Osaka (JP); Hideharu Takezawa, Nara (JP); Kazuhiro Okamura, Osaka (JP); Mikinari Shimada, Kyoto (JP)

(73) Assignee: Panasonic Corporation, Osaka (JP)

( * ) Notice: Subject to any disclaimer, the term of this patent is extended or adjusted under 35 U.S.C. 154(b) by 807 days.

This patent is subject to a terminal disclaimer.

(21) Appl. No.: 11/473,334

(22) Filed: Jun. 23, 2006

(65) Prior Publication Data

US 2006/0286445 A1 Dec. 21, 2006

Related U.S. Application Data

(63) Continuation-in-part of application No. 11/315,189, filed on Dec. 23, 2005.

(30) Foreign Application Priority Data

Dec. 24, 2004 (JP) ................................. 2004-374200

(51) Int. Cl.
*H01M 4/13* (2010.01)
(52) U.S. Cl. ..................... 429/224; 429/208; 429/218.1; 429/223; 252/182.1
(58) Field of Classification Search ........................ None
See application file for complete search history.

(56) References Cited

U.S. PATENT DOCUMENTS

| | | | |
|---|---|---|---|
| 5,705,292 A * | 1/1998 | Yukita et al. | ................... 429/137 |
| 5,869,208 A | 2/1999 | Miyasaka | |
| 6,053,953 A | 4/2000 | Tomiyama et al. | |
| 6,287,720 B1 * | 9/2001 | Yamashita et al. | ............. 429/131 |
| 6,395,250 B2 * | 5/2002 | Matsubara et al. | ......... 423/594.4 |
| 6,447,958 B1 | 9/2002 | Shinohara et al. | |
| 6,660,432 B2 | 12/2003 | Paulsen et al. | |
| 6,682,850 B1 | 1/2004 | Numata et al. | |
| 6,964,828 B2 | 11/2005 | Lu et al. | |
| 2001/0046628 A1 | 11/2001 | Oesten et al. | |
| 2002/0055036 A1 * | 5/2002 | Shinohara et al. | ............... 429/62 |

(Continued)

FOREIGN PATENT DOCUMENTS

CN 1692312 A 11/2005

(Continued)

OTHER PUBLICATIONS

Ohzuku, Layered Lithium Insertion Material LiCo1/3Ni1/3Mn1/3O2 for Lithium-Ion batteries, Chemistry Letters, The Chemical Society of Japan, CL-010390, 2001, pp. 642-643.*

H. Kim et al. Electrochemical and physical properties of composite polymer electrolyte of poly (methyl methacrylate) and poly (ethylene glycol diacrylate). Journal of Power Sources. 2003. pp. 221-224.124.

(Continued)

*Primary Examiner* — Cynthia Lee
(74) *Attorney, Agent, or Firm* — McDermott Will & Emery LLP

(57) ABSTRACT

A non-aqueous electrolyte secondary battery including: a positive electrode having a positive electrode material mixture containing a composite lithium oxide; a negative electrode; a polyolefin separator; a non-aqueous electrolyte; and a heat-resistant insulating layer interposed between the positive and negative electrodes. The positive electrode material mixture has an estimated heat generation rate at 200° C. of not greater than 50 W/kg. The positive electrode and the negative electrode are wound together with the separator and the heat-resistant insulating layer interposed therebetween.

15 Claims, 2 Drawing Sheets

U.S. PATENT DOCUMENTS

| | | |
|---|---|---|
| 2004/0029012 A1 | 2/2004 | Tanizaki et al. |
| 2004/0053134 A1* | 3/2004 | Ozaki et al. ............ 429/231.1 |
| 2004/0191633 A1* | 9/2004 | Johnson et al. ............ 429/246 |
| 2005/0084760 A1 | 4/2005 | Hwang et al. |
| 2005/0233217 A1 | 10/2005 | Fujihara et al. |

FOREIGN PATENT DOCUMENTS

| | | |
|---|---|---|
| EP | 1819008 A1 | 8/2007 |
| EP | 1881545 A1 | 1/2008 |
| JP | 07-005546 * | 1/1995 |
| JP | 09-055210 * | 2/1995 |
| JP | 07-220759 * | 8/1995 |
| JP | 8-138670 | 5/1996 |
| JP | 09-055210 * | 2/1997 |
| JP | 09-055210 A | 2/1997 |
| JP | 09-208736 | 8/1997 |
| JP | 10-294100 | 11/1998 |
| JP | 11-016566 A | 1/1999 |
| JP | 11-167918 A | 6/1999 |
| JP | 11-224664 A | 8/1999 |
| JP | 11-307094 A | 11/1999 |
| JP | 2000-030686 A | 1/2000 |
| JP | 2000-077071 A | 3/2000 |
| JP | 2001-266949 | 9/2001 |
| JP | 2002-151044 | 5/2002 |
| JP | 2002-319405 | 10/2002 |
| JP | 2003-036838 A | 2/2003 |
| JP | 2003-077460 A | 3/2003 |
| JP | 2004-303642 A | 10/2004 |
| JP | 2005-183179 A | 7/2005 |
| JP | 2005-339938 A | 12/2005 |
| JP | 2006-12788 A | 1/2006 |
| KR | 10-2005-0030763 | 3/2005 |
| KR | 10-2007-0088678 | 6/2007 |
| WO | WO 2005/117167 A1 | 12/2005 |

OTHER PUBLICATIONS

T. Ohzuku et al. "Layered Lithium Insertion Material of $LiNi_{1/2}Mn_{1/2}O_2$: A Possible Alternative to $LiCoO_2$ for Advanced Lithium-Ion Batteries". Chemistry Letters. 2001. pp. 744-745. The Chemical Society of Japan.

T. Ohzuku et al. "Layered Lithium Insertion Material of $LiCo_{1/3}Ni_{1/3}O_2$ for Lithium-Ion Batteries", Chemistry Letters. 2001. pp. 642-643. The Chemical Society of Japan.

U.S. Office Action, issued in corresponding U.S. Patent Application No. 11/339,617, dated on Jul. 12, 2007.

Korean Office Action issued in Koran Patent Application No. KR 10-2007-7012936 dated on Apr. 14, 2008.

US Office Action issued in U.S. Appl. No. 11/315,189 dated on Sep. 3, 2008.

Chinese Office Action, with English Translation, issued in Chinese Patent Application No. CN 2006-800013039 dated on Jul. 25, 2008.

United States Office Action issued in U.S. Appl. No. 11/473,327, mailed Oct. 16, 2009.

United States Notice of Allowance issued in U.S. Appl. No. 11/315,189 dated Dec. 7, 2009.

Observations by a third party submitted to the European Patent Office issued on Feb. 2, 2011.

Notice of observations by a third party submitted to the Japanese Patent Office issued on Feb. 17, 2011.

United States Office Action issued in U.S. Appl. No. 11/473,327, mailed Mar. 29, 2010.

United States Office Action issued in U.S. Appl. No. 11/473,327 dated Jul. 21, 2010.

United States Office Action issued in U.S. Appl. No. 11/473,327 dated Nov. 9, 2010.

* cited by examiner

NON-AQUEOUS ELECTROLYTE SECONDARY BATTERY

CROSS-REFERENCE TO RELATED APPLICATION

This application is a continuation-in-part of U.S. patent application Ser. No. 11/315,189 filed Dec. 23, 2005 which in turn claims the benefit of Japanese Application No. 2004-374200 filed Dec. 24, 2004, the disclosures of which Applications are incorporated by reference herein in their entirety.

FIELD OF THE INVENTION

The present invention relates to a non-aqueous electrolyte secondary battery, and more particularly to an improvement of safety thereof.

BACKGROUND OF THE INVENTION

In recent years, there has been a rapid advancement in the development of potable and cordless electronic devices. With this development, the commercialization of non-aqueous electrolyte secondary batteries having a high voltage and a high energy density as the power sources for driving these electronic devices is proceeding.

The positive electrode for non-aqueous electrolyte secondary batteries usually contains a composite lithium oxide having a high oxidation-reduction potential. The most commonly used composite lithium oxides are lithium cobalt oxide, lithium nickel oxide and lithium manganese oxide. The negative electrode for non-aqueous electrolyte secondary batteries usually contains a carbon material. Non-aqueous electrolyte secondary batteries also contain a non-aqueous electrolyte prepared by dissolving a lithium salt in a non-aqueous solvent. As the lithium salt, $LiClO_4$ and $LiPF_6$ are typically used. Between the positive electrode and the negative electrode is disposed a separator. The separator is usually a microporous film made of a polyolefin resin material.

In the event where a short circuit of a relatively low resistance is caused inside a battery by some kind of factor, a large current flows intensively through the shorted point. The battery is thus heated and may reach a excessively high temperature. In order to prevent such phenomenon, various precautions are taken to provide safe batteries.

In the production aspect, the control of metal powders and the control of dust in the production atmosphere are conducted to prevent the intrusion of foreign matter into a battery. Another way is to protect the exposed portion(s) of current collectors having low resistance with, for example, an insulating tape so as to minimize the risk of an internal short-circuit.

Separators having shut-down function are also used. In the event were a short-circuit of a relatively low resistance occurs inside a battery, the pores of a separator having shut-down function close at about 135° C. so as to cut off an ion current. The short-circuit current is thus cut off, and heat generation stops. The surface temperature of the battery, however, increases to about 120° C.

In order to prevent an internal short-circuit, for example, Japanese Laid-Open Patent Publication No. Hei 7-220759 proposes to form, on an electrode, a 0.1 to 200 μm thick layer composed of an inorganic particle and a resin binder. An internal short-circuit often results from partial separation of a material from an electrode during the production of the battery. The above-mentioned publication is intended to improve the production yield by preventing such internal short-circuit.

Japanese Laid-Open Patent Publication No. Hei 9-208736 proposes to apply a heat-resistant resin (e.g., aramid) to a separator. This publication is also intended to prevent an internal short-circuit.

According to the above proposals, it is possible to reduce heat generation to a certain extent in the event where an internal short-circuit occurs locally. However, in nail penetration test which is a test to assess safety by simulating possible multiple simultaneous internal short-circuits that can cause damage to a battery, multiple shorted points occur simultaneously. Under such severe short-circuit conditions, the batteries disclosed by the above publications cannot always reduce heat generation, and the batteries may reach an excessively high temperature.

When a typical lithium ion battery, which comprises a positive electrode containing lithium cobalt oxide, a negative electrode containing graphite and a separator made of a polyethylene microporous film, is subjected to nail penetration test, the battery temperature increases until the separator exerts its shutdown function, and the surface temperature of the battery reaches about 120° C. This temperature increase is due to Joule heat generated inside the battery by short-circuit current.

Because the separator's shutdown function cuts the short-circuit current, heat generation is reduced before the battery temperature reaches more than 120° C. The safety evaluation standards for nail penetration test and crush test established by Japan Storage Battery Association require that batteries should be free from smoke, ignition and rupture, and no standard is set as to battery temperature. As such, even if the surface temperature of a battery reaches about 120° C., as long as the shutdown function works and heat generation is reduced, the battery is deemed to be satisfying the safety standards.

However, even if the safety standards are satisfied, when the surface temperature of a battery increases to about 120° C., the temperature of the electronic device containing the battery also increases, which may cause deformation of the body of the electronic device and impair safety of the electronic device. Under the circumstances, there is a desire for batteries with further enhanced safety and reliability. More specifically, there is a very strong desire to reduce the maximum battery surface temperature to 80° C. or lower even when an internal short-circuit occurs.

In the case of the battery disclosed by Japanese Laid-Open Patent Publication No. Hei 7-220759 having a 0.1 to 200 μm thick layer composed of an inorganic particle and a resin binder formed on an electrode, the battery surface temperature can reach as high as 80° C. or higher in the nail penetration test.

Similarly, in the case of the battery disclosed by Japanese Laid-Open Patent Publication No. Hei 9-208736 having a separator with a heat-resistant resin applied thereon, the battery surface temperature can reach as high as 80° C. or higher in the nail penetration test.

Therefore, according to the above-mentioned publications, battery surface temperature cannot always be reduced to not greater than 80° C. when multiple shorted points occur simultaneously. The reason that the battery surface temperature increases to higher than 80° C. in the nail penetration test can be explained as follows.

In the case where internal short-circuit occurs discretely, the layer composed of an inorganic particle and a resin binder as well as the heat-resistant resin prevent the shorted point from expanding. Because the shorted point burns out instantly due to its self heat-generation, the short circuit condition lasts only for 0.1 to 0.5 seconds. Thereafter, the electrical insulation recovers. Once the short-circuit current is cut off, the generated heat spreads out through the entire battery, and therefore the battery temperature does not increase to a high temperature. The rest (i.e., the area other than the shorted point) has a relatively low temperature, so that the heat spreads out smoothly.

In the case of the nail penetration test, in contrast, multiple shorted points occur simultaneously in a battery. Under such severe short-circuit conditions, heat is generated not only by the internal short-circuits, but also by thermal decomposition reaction of the positive electrode active material which generates heat continuously. Accordingly, the heat release rate at which heat spreads lags behind the heat generation rate, and thermal decomposition reaction of the positive electrode active material proceeds increasingly. This causes the separation or burn-out of the positive electrode active material near the shorted points. The positive electrode current collector (e.g., aluminum foil) is thus exposed to create another shorted point. As a result, such internal short-circuit condition is maintained, and the surface temperature of the battery increases until it reaches the temperature at which the separator exerts its shut-down function, namely, about 120° C. In the case of discrete internal short-circuit, the thermal decomposition reaction of the positive electrode active material does not proceed. As such, the separation or burn-out of the positive electrode active material does not occur, and thus additional shorted point is not created.

BRIEF SUMMARY OF THE INVENTION

In view of the above, the present invention is intended to improve the above situation and provides a non-aqueous electrolyte secondary battery having a higher level of safety than conventional ones while maintaining a high energy density.

The present invention relates to a non-aqueous electrolyte secondary battery comprising: a positive electrode comprising a positive electrode material mixture containing a composite lithium oxide and a positive electrode current collector carrying the positive electrode material mixture; a negative electrode comprising a material capable of absorbing and desorbing lithium; a separator interposed between the positive electrode and the negative electrode, the separator comprising a polyolefin resin; a non-aqueous electrolyte; and a heat-resistant insulating layer interposed between the positive electrode and the negative electrode, wherein the positive electrode and the negative electrode are wound together with the separator and the heat-resistant insulating layer interposed therebetween, wherein the positive electrode material mixture has an estimated heat generation rate at 200° C. of not greater than 50 W/kg.

In one embodiment of the present invention, the heat-resistant insulating layer has a thickness of 1 µm or more and 15 µm or less.

In another embodiment of the present invention, the heat-resistant insulating layer has a thickness of 1 µm or more and 5 µm or less.

The estimated heat generation rate is, for example, determined by the steps of: (i) determining a relation between absolute temperature T and heat generation rate V of the positive electrode material mixture using an accelerating rate calorimeter (ARC) (i.e. a runaway reaction measuring apparatus); (ii) plotting a relation between the inverse of absolute temperature T as an X coordinate and the logarithm of heat generation rate V as a Y coordinate according to the Arrhenius law; (iii) obtaining an approximate straight line fitted to the plotted points in a heat generation temperature range of T<200° C. (473 K); and (iv) extrapolating the obtained approximate straight line to the temperature axis at T=200° C. (473 K).

As used herein, the heat generation temperature range means a range in which the absolute value of the negative gradient of the approximate straight line is the largest in a plot according to the Arrhenius law. Accordingly, in the step (iii), the approximate straight line should be drawn such that the absolute value of the negative gradient is the largest. The extrapolation is a method for estimating a value that falls outside a range of known values based on the known values in data, and it is widely used in various fields.

The composite lithium oxide is preferably one of the following.

(i) A composite lithium oxide having a composition represented by a general formula (1) : $Li_aM_bMe_cO_2$, where element M is at least one selected from the group consisting of Al, Mn, Sn, In, Fe, Cu, Mg, Ti, Zn, Zr and Mo, and element Me is at least one selected from the group consisting of Ni and Co, and where the general formula (1) satisfies: $0.9<a<1.2$; $0.02 \leq b \leq 0.5$; $0.5 \leq c \leq 0.98$; and $0.95 \leq b+c \leq 1.05$.

(ii) A composite lithium oxide having a composition represented by a general formula (2) : $Li_aM_bNi_cCo_eO2$, where element M is at least one selected from the group consisting of Al, Mn, Sn, In, Fe, Cu, Mg, Ti, Zn, Zr and Mo, and where the general formula (2) satisfies: $0.9<a<1.2$; $0.02 \leq b \leq 0.5$; $0.1 \leq d \leq 0.5$; $0.1 \leq e \leq 0.5$; and $0.95 \leq b+d+e \leq 1.05$. More preferably, the general formula (2) satisfies: $0.15 \leq b \leq 0.4$; $0.3 \leq d \leq 0.5$; and $0.15 \leq e \leq 0.4$.

(iii) A composite lithium oxide having any composition comprising element M, the element M being at least one selected from the group consisting of Al, Mn, Sn, In, Fe, Cu, Mg, Ti, Zn, Zr and Mo, and the element M being distributed more in a surface portion of the composite lithium oxide than the inside of the composite lithium oxide. Similarly, in the composite lithium oxides represented by the general formula (1) and (2), the element M is preferably distributed more in a surface portion than the inside of the composite lithium oxides.

The composite lithium oxide has preferably been treated with an Si compound represented by a general formula (3): X—Si—Y₃. In the formula (3), X includes a functional group reactive with the composite lithium oxide, and Y includes a functional group comprising C, H, O, F or Si.

According to the present invention, the heat generation due to internal short circuit and the chain of heat generation reaction are effectively prevented even under severe conditions where multiple shorted points occur simultaneously. Because the maintenance of the short circuit is avoided, the maximum battery surface temperature can always be maintained at not greater than 80° C. According to the present invention, it is possible to provide a non-aqueous electrolyte secondary battery having a higher level of safety than conventional ones while maintaining a high energy density.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
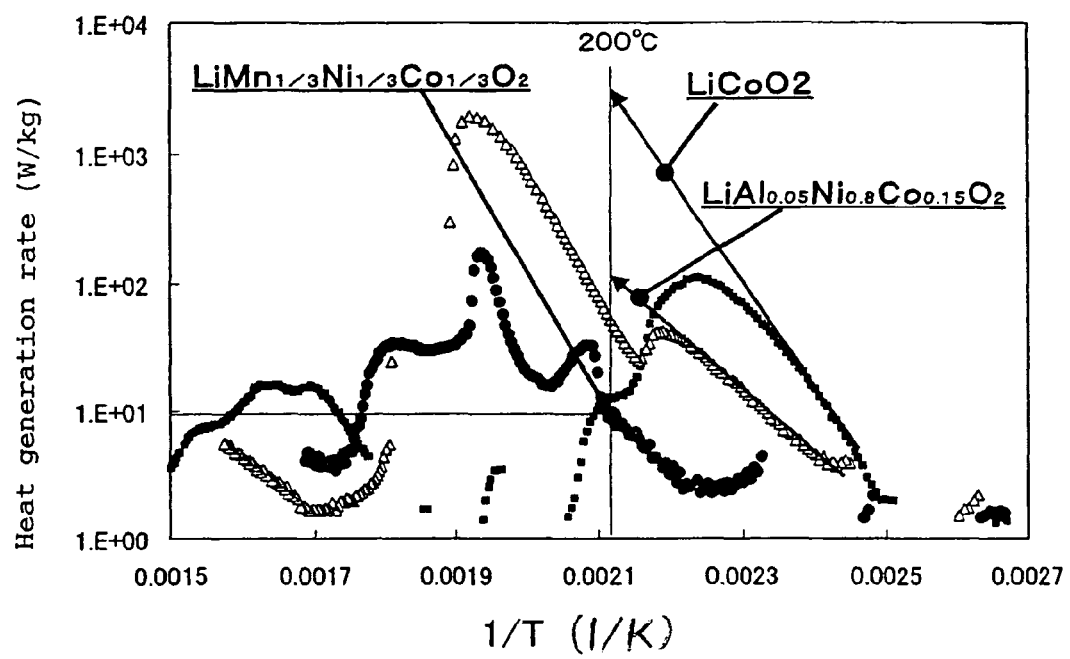
FIG. 1 shows relations between the inverse of absolute temperature T and the logarithm of heat generation rate V determined by an accelerating rate calorimeter (ARC) for different positive electrode materials according to the Arrhenius law.

A non-aqueous electrolyte secondary battery of the present invention comprises: a positive electrode comprising a positive electrode material mixture containing a composite lithium oxide and a positive electrode current collector carrying the positive electrode material mixture; a negative electrode comprising a material capable of absorbing and desorbing lithium; a separator comprising a polyolefin resin; a non-aqueous electrolyte; and a heat-resistant insulating layer interposed between the positive electrode and the negative electrode.

The heat-resistant insulating layer is, for example, formed on either the positive electrode or the negative electrode on a surface thereof facing the other electrode, but the arrangement of the heat-resistant insulating layer is not limited thereto. The heat-resistant insulating layer may be formed on at least one surface of the positive electrode, or on at least one surface of the negative electrode, or on at least one surface of the separator. Alternatively, it may be formed on at least one surface of the positive electrode and at least one surface of the negative electrode, or on at least one surface of the negative electrode and at least one surface of the separator, or on at least one surface of the separator and at least one surface of the positive electrode. Alternatively, it may be formed on at least one surface of the positive electrode and at least one surface of the negative electrode and at least one surface of the separator. The heat-resistant insulating layer may be in the form of a sheet independent of the positive electrode, the negative electrode and the separator. However, the heat-resistant insulating layer is desirably bonded or adhered to at least one surface of the positive electrode, to at least one surface of the negative electrode, or to at least one surface of the separator.

A feature of the present invention is that the estimated heat generation rate at 200° C. of the positive electrode material mixture is controlled to not greater than 50 W/kg. The estimated heat generation is, for example, determined by the steps of: (i) determining a relation between absolute temperature T and heat generation rate V of the positive electrode material mixture using an accelerating rate calorimeter; (ii) plotting a relation between the inverse of absolute temperature T (X coordinate) and the logarithm of heat generation rate V (Y coordinate) according to the Arrhenius law; (iii) obtaining an approximate straight line fitted to the plotted points in a heat generation temperature range of T<200° C. (473 K); and (iv) extrapolating the obtained approximate straight line to the temperature axis at T=200° C. (473 K).

When the positive electrode material mixture has an estimated heat generation rate at 200° C. determined by the extrapolation of 50 W/kg or less, the contribution of the heat-resistant insulating layer to safety is significantly enhanced particularly under severe conditions where multiple shorted points occur simultaneously. The present invention has been accomplished based on the above finding, and provides an extremely higher level of safety than conventional batteries.

The estimated heat generation rate at 200° C. of the positive electrode material mixture can be controlled to not greater than 50 W/kg by using positive electrode materials shown below.

As an effective positive electrode material to control the estimated heat generation rate to not greater than 50 W/kg, a composite lithium oxide having a composition represented by a general formula (1): $Li_aM_bMe_cO_2$, where element M is at least one selected from the group consisting of Al, Mn, Sn, In, Fe, Cu, Mg, Ti, Zn, Zr and Mo, and element Me is at least one selected from the group consisting of Ni and Co, and where the general formula (1) satisfies: $0.9<a<1.2$, $0.02 \leq b \leq 0.5$; $0.5 \leq c \leq 0.98$; and $0.95 \leq b+c \leq 1.05$ can be used.

From the viewpoint of reducing the estimated heat generation rate, the element M is preferably Mn, Al or Mg, most preferably Mn, although all the above-listed elements (i.e., Al, Mn, Sn, In, Fe, Cu, Mg, Ti, Zn, Zr and Mo) have the effect of reducing the estimated heat generation rate.

In the general formula (1), the value of "a" is the initial value which fluctuates during charge/discharge of the battery. The initial value should be actually the same as the value of "a" of the composite lithium oxide contained in a battery in a discharged state. Typically, the composite lithium oxide immediately after the production has a value of "a" of 1.

When the value of "b" is less than 0.02, the effect of the element M cannot be observed. When the value of "b" exceeds 0.5, the capacity decreases significantly.

When the value of "c" is less than 0.5, it is difficult to ensure a certain amount of capacity. When the value of "c" exceeds 0.98, the effect of reducing the estimated heat generation rate cannot be obtained.

The general formula (1) satisfies $0.95 \leq b+c \leq 1.05$. In the initial condition immediately after the production (i.e., in a fresh condition before initial charge/discharge is performed), the value of "b+c" is typically 1, but it is not necessarily exactly 1. As long as the value of "b+c" falls within the range: $0.95 \leq b+c \leq 1.05$, the value of "b+c" can be deemed as 1 (b+c=1).

Another effective positive electrode material to control the estimated heat generation rate to not greater than 50 W/kg is a composite lithium oxide having a composition represented by a general formula (2): $Li_aM_bNi_cCo_eO_2$, where element M is at least one selected from the group consisting of Al, Mn, Sn, In, Fe, Cu, Mg, Ti, Zn, Zr and Mo, and where the general formula (2) satisfies: $0.9<a<1.2$; $0.02 \leq b \leq 0.5$; $0.1 \leq d \leq 0.5$; $0.1 \leq e \leq 0.5$; and $0.95 \leq b+d+e \leq 1.05$. More preferably, the general formula (2) satisfies: $0.15 \leq b \leq 0.4$; $0.3 \leq d \leq 0.5$; and $0.15 \leq e \leq 0.4$.

In the general formula (2) also, the value of "a" is the initial value so that it fluctuates during charge/discharge. When the value of "b" is less than 0.02, the effect of the element M cannot be observed. When the value of "b" exceeds 0.5, the capacity decreases significantly.

When the value of "d" is less than 0.1, the effect obtained by the addition of Ni (e.g., the effect of improving theoretical capacity) drops. When the value of "d" exceeds 0.5, the battery voltage lowers and cycle life characteristic also deteriorates.

When the value of "e" is less than 0.1, the effect obtained by the addition of Co (e.g., the effect of increasing voltage) drops. When the value of "e" exceeds 0.5, the utilization efficiency of the positive electrode lowers.

The general formula (2) satisfies $0.95 \leq b+d+e \leq 1.05$. In the initial condition immediately after the production (i.e., in a fresh condition before initial charge/discharge is performed), the value of "b+d+e" is typically 1, but it is not necessarily exactly 1. As long as the value of "b+d+e" falls within the range: $0.95 \leq b+d+e \leq 1.05$, the value of "b+d+e" can be deemed as 1 (b+d+e=1).

A specific example of the positive electrode material represented by the formula (2) and effective to control the estimated heat generation rate at 200° C. to not greater than 50 W/kg is $LiMn_bNi_dCO_eO_2$, where $0.15 \leqq b \leqq 0.35$, $0.3 \leqq d \leqq 0.5$, and $0.25 \leqq e \leqq 0.35$.

Another effective positive electrode material to control the estimated heat generation rate to not greater than 50 W/kg is a composite lithium oxide having any composition comprising element M, the element M being at least one selected from the group consisting of Al, Mn, Sn, In, Fe, Cu, Mg, Ti, Zn, Zr and Mo, and the element M being distributed more in a surface portion of the composite lithium oxide than the inside of the composite lithium oxide.

Such positive electrode material can be obtained by applying a compound containing the element M (e.g., a nitrate or sulfate) onto the surface of a composite lithium oxide having any composition (e.g., a composite lithium oxide represented by the general formula (1) or (2)) and diffusing the element M into the composite lithium oxide. As an example, a mixture prepared by mixing a composite lithium oxide with a small amount of compound containing the element M is baked at an appropriate temperature, whereby the element M diffuses from the surface into the inside of the composite lithium oxide. As a result, a composite lithium oxide in which the element M is distributed more in the surface portion than the inside can be obtained. Alternatively, a liquid dissolving or dispersing a compound containing the element M is mixed with a lithium composite oxide, after which the liquid component is removed to obtain a composite lithium oxide carrying the element M. By baking the thus-obtained composite lithium oxide at an appropriate temperature (e.g., 300 to 700° C.), the element M can be diffused from the surface into the inside of the composite lithium oxide.

The compounds containing the element M have a significant effect in reducing the estimated heat generation rate at 200° C. However, as the amount of compound containing the element M to be added to a composite lithium oxide is increased, the utilization efficiency of the positive electrode decreases, and the energy density of the resulting battery decreases. Because the heat generation reaction of the positive electrode takes place on the surface of the active material particles, by having more element M on the surface of the active material particles, heat generation can be reduced efficiently without significant decrease of the utilization efficiency of the positive electrode. In other words, the addition of only a small amount of element M can reduce the estimated heat generation rate because the element M is distributed intensely on the surface of the active material particles.

The amount of the compound containing the element M is preferably adjusted such that the amount of the element M is 0.0001 mol to 0.05 mol per 1 mol of the composite lithium oxide.

Another effective positive electrode material to control the estimated heat generation rate to not greater than 50 W/kg is a composite lithium oxide treated with an Si compound represented by a general formula (3): $X-Si-Y_3$. In the formula (3), X includes a functional group reactive with the composite lithium oxide, and Y includes a functional group comprising C, H, O, F or Si. By reforming the surface of the composite lithium oxide with an Si compound, the heat generation reaction that takes place on the surface of the active material particles can be reduced, and therefore the estimated heat generation rate can be reduced. The composite lithium oxide treated with an Si compound does not significantly affect the utilization efficiency of the positive electrode.

The composite lithium oxide is preferably treated with a silane coupling agent represented by $X-Si-Y_3$, for example. The method for treating the composite lithium oxide with a silane coupling agent represented by $X-Si-Y_3$ is not specifically limited. As an example, a silane coupling agent is mixed with water to prepare a mixture. The obtained mixture is then mixed with a composite lithium oxide, followed by drying. The concentration of the silane coupling agent in the mixture of the silane coupling agent and water is preferably about 0.01 wt % to 5 wt %, more preferably, 0.1 wt % to 3 wt %. The amount of the silane coupling agent is preferably 0.001 to 0.5 parts by weight per 100 parts by weight of the composite lithium oxide, more preferably 0.01 to 0.1 parts by weight.

Examples of the silane coupling agent include vinyl triethoxy silane, vinyl trimethoxy silane, vinyl trichloro silane, vinyl tris(2-methoxyethoxy)silane, γ-methacryloxypropyl trimethoxy silane, γ-methacryloxypropyl triethoxy silane, γ-aminopropyl triethoxy silane, γ-aminopropyl trimethoxy silane, N-β-(aminoethyl)-γ-aminopropyl trimethoxy silane, N-β-(aminoethyl)-γ-aminopropyl triethoxy silane, γ-ureidopropyl triethoxy silane, γ-ureidopropyl trimethoxy silane, β-(3,4-epoxycyclohexyl)ethyl trimethoxy silane, β-(3,4-epoxycyclohexyl)ethyl triethoxy silane, γ-glycidoxypropyl trimethoxy silane, γ-glycidoxypropyl triethoxy silane, γ-mercaptopropyl trimethoxy silane, γ-mercaptopropyl triethoxy silane, γ-chloropropyl trimethoxy silane, γ-chloropropyl triethoxy silane, methyl triethoxy silane, methyl trimethoxy silane, phenyl triethoxy silane, and phenyl trimethoxy silane. Among them, particularly preferred are vinyl triethoxy silane, vinyl trimethoxy silane, vinyl tris(2-methoxyethoxy) silane, γ-methacryloxypropyl trimethoxy silane, γ-methacryloxypropyl triethoxy silane, γ-aminopropyl triethoxy silane, γ-aminopropyl trimethoxy silane, N-β-(aminoethyl)-γ-aminopropyl trimethoxy silane, N-β-(aminoethyl)-γ-aminopropyl triethoxy silane, γ-ureidopropyl triethoxy silane, γ-ureidopropyl trimethoxy silane, β-(3,4-epoxycyclohexyl)ethyl trimethoxy silane, β-(3,4-epoxycyclohexyl)ethyl triethoxy silane, γ-glycidoxypropyl trimethoxy silane, and γ-glycidoxypropyl triethoxy silane.

The heat-resistant insulating layer comprises, for example, an inorganic oxide filler and a resin component. The inorganic oxide filler has high thermal resistance. Accordingly, the heat-resistant insulating layer can retain its high mechanical strength even when the battery temperature reaches relatively a high level. The resin component contained in the heat-resistant insulating layer may be any resin component, but a resin component having high thermal resistance is preferably used because a heat-resistant insulating layer having excellent thermal resistance can be obtained.

For example, the heat-resistant insulating layer comprises an inorganic oxide filler and a binder (resin component) or comprises a heat-resistant resin (resin component), but there is no particular limitation. When the heat-resistant insulating layer comprises an inorganic oxide filler and a binder, it has a relatively high mechanical strength and hence a high durability. The main component of the heat-resistant insulating layer comprising an inorganic oxide filler and a binder is the inorganic oxide filler. For example, the inorganic oxide filler constitutes not less than 80 wt %, preferably not less than 90 wt %, of the heat-resistant insulating layer. When the heat-resistant insulating layer comprises a heat-resistant resin, the heat-resistant resin constitutes, for example, more than 20 wt % of the heat-resistant insulating layer.

The heat-resistant insulating layer comprising a heat-resistant resin has a higher flexibility than the heat-resistant insulating layer composed mainly of an inorganic oxide filler, since heat-resistant resins are more flexible than inorganic oxide fillers. Thus, the heat-resistant insulating layer comprising a heat-resistant resin is more likely to conform to expansion and contraction of the electrode plates during charge/discharge, so that it is capable of retaining its high heat resistance and provides a high safety upon nail penetration.

The heat-resistant insulating layer comprising a heat-resistant resin can contain, for example, less than 80 wt % of an inorganic oxide filler. When the heat-resistant insulating layer contains an inorganic oxide filler, it has a good balance between flexibility and durability. Heat-resistant resins contribute to the flexibility of the heat-resistant insulating layer, while inorganic oxide fillers having high mechanical strength contribute to the durability. The inclusion of an inorganic oxide filler in the heat-resistant insulating layer improves the high output characteristics of the battery. This is probably because flexibility and durability produce a synergistic effect of optimizing the pore structure of the heat-resistant insulating layer, although the detailed reason is not clear. In terms of ensuring good high output characteristics, it is preferred that the heat-resistant insulating layer comprising a heat-resistant resin contain 25 wt % to 75 wt % of an inorganic oxide filler.

The resin component (binder or heat-resistant resin) of the heat-resistant insulating layer preferably has a thermal decomposition temperature of not less than 250° C. and does not deform significantly at a high temperature. That is, the resin component of the heat-resistant insulating layer is preferably amorphous or non-crystalline. Also, the resin component preferably has a thermal deformation temperature or glass transition temperature (Tg) of not less than 250° C.

The thermal decomposition temperature, thermal deformation temperature or glass transition temperature of the resin component can be measured by differential scanning calorimetry (DSC) or thermogravimetry-differential thermal analysis (TG-DTA). The temperature at which the weight starts to change in the TG-DTA corresponds to thermal decomposition temperature. The inflection point of the endothermic shift in the DSC corresponds to thermal deformation temperature or glass transition temperature.

Preferred examples of the binder contained in the heat-resistant insulating layer include fluorocarbon resins such as polyvinylidene fluoride (PVDF), and rubbery polymers containing an acrylonitrile unit (modified acrylonitrile rubber). They may be used singly or in any combination of two or more. Among them, particularly preferred are rubbery polymers containing an acrylonitrile unit because they have appropriate thermal resistance, elasticity and binding capability.

Preferred examples of the heat-resistant resin contained in the heat-resistant insulating layer include polyamide resins such as aromatic polyamide (aramid), polyimide resins, and polyamide imide resins. They may be used singly or in any combination of two or more.

Preferably, the heat-resistant insulating layer comprising an inorganic oxide filler and a binder is formed on or bonded to at least one surface of the negative electrode, and more preferably, this layer is formed on or bonded to both surfaces of the negative electrode. Preferably, the heat-resistant insulating layer comprising a heat-resistant resin is formed on or bonded to at least one surface of the separator. Since the heat-resistant insulating layer is relatively brittle, it is more preferred that this layer be formed on or bonded to only one surface of the separator. When the heat-resistant insulating layer comprising a heat-resistant resin is formed on only one surface of the separator, the ratio of the thickness A of the separator to the thickness B of the heat-resistant insulating layer (A/B ratio) satisfies, for example, the relation: $3 \leq A/B \leq 12$, or $4 \leq A/B \leq 6$, in terms of preventing the breakage of the heat-resistant insulating layer.

Examples of the inorganic oxide filler include alumina ($Al_2O_3$), titania ($TiO_2$), silica ($SiO_2$), zirconia and magnesia. They may be used singly or in any combination of two or more. Among them, particularly preferred are alumina ($\alpha$-alumina in particular) and magnesia because they are stable, easy to handle and less costly.

The average particle size (median size: D50) of the inorganic oxide filler is not specifically limited. Preferably, the inorganic oxide filler has an average particle size of 0.1 μm to 5 μm, more preferably, 0.2 μm to 1.5 μm.

When the heat-resistant insulating layer comprises an inorganic oxide filler and a binder, the content of the inorganic oxide filler is preferably not less than 50 wt % and not greater than 99 wt %, more preferably, not less than 90 wt % and not greater than 99 wt %. When the content of the inorganic oxide filler is less than 50 wt %, the amount of the resin component is excessively large, the control of the pore structure among the filler particles might be difficult. Conversely, when the content of the inorganic oxide filler exceeds 99 wt %, the amount of the resin component is excessively small, which might impair the mechanical strength of the heat-resistant insulating layer or the adhesion of the heat-resistant insulating layer to electrode surface or separator surface.

The thickness of the heat-resistant insulating layer is not specifically limited. In order for the heat-resistant insulating layer to fully exert short-circuit prevention function, or to fully insulate the shorted points while retaining the design capacity, the heat-resistant insulating layer has, for example, a thickness of 1 μm or more and 15 μm or less. The thickness of the heat-resistant insulating layer comprising an inorganic oxide filler and a binder is, for example, 3 to 15 μm, or 3 to 8 μm. The thickness of the heat-resistant insulating layer comprising a heat-resistant resin is, for example, 1.5 to 7 μm, or 1.7 to 6.7 μm. If the heat-resistant insulating layer is too thick, it may break when the electrodes are wound, since the heat-resistant insulating layer is brittle. However, if the heat-resistant insulating layer is too thin, it has poor strength, so it may break.

In the present invention, any type of conventional separators can be used. For example, a monolayer separator made of polyolefin resin such as polyethylene or polypropylene, or a multilayer separator made of polyolefin resin can be used. A preferred thickness of the separator is, but not limited to, about 15 μm to 25 μm.

The positive electrode material mixture comprises an active material comprising a composite lithium oxide as the essential component. Optionally, the positive electrode material mixture further comprises a binder, a conductive material, etc. Examples of the binder for the positive electrode include polytetrafluoroethylene (PTFE), modified acrylonitrile rubber particles, and PVDF. They may be used singly or in any combination of two or more. PTFE and modified acrylonitrile rubber particles are preferably combined with carboxymethyl cellulose, polyethylene oxide or modified acrylonitrile rubber for use. They serve as a thickener in the paste composed of the positive electrode material mixture and a liquid component. As the conductive material for the positive electrode, acetylene black, ketjen black or any graphite can be used. They may be used singly or in any combination of two or more. The amount of the binder contained in the positive electrode material mixture is preferably 0.1 to 5 parts by weight per 100 parts by weight of the active material. The amount of the conductive material contained in the positive electrode material mixture is preferably 1 to 10 parts by weight per 100 parts by weight of the active material.

For producing a negative electrode comprising a carbon material or alloy material, any conventional material for negative electrodes can be used. Examples of the carbon material include any natural graphite and any artificial graphite. Examples of the alloy material include a silicon alloy and a tin alloy. The carbon material and the alloy material may be combined. The negative electrode may further contain a binder, a conductive material, etc. As the binder and the conductive material for the negative electrode, those listed above for the positive electrode can be used.

The non-aqueous electrolyte is preferably prepared by dissolving a lithium salt as the solute in a non-aqueous solvent. The lithium salt and the non-aqueous solvent are not specifically limited. Preferred examples of the lithium salt include $LiPF_6$ and $LiBF_4$. Preferred examples of the non-aqueous solvent include ethylene carbonate, propylene carbonate, dimethyl carbonate, diethyl carbonate, and methyl ethyl carbonate. The non-aqueous solvent is preferably used in combination of two or more, rather than alone. Preferably, the non-aqueous solvent contains, as an additive, vinylene carbonate, vinylethylene carbonate or cyclohexylbenzene.

The present invention will be described below in further detail with reference to experiments and examples, but it should be understood that the scope of the present invention is not limited thereto.

Experiment 1
Measurement of Temperature of Shorted Point

Ten different 18650 type cylindrical non-aqueous electrolyte secondary batteries each having a diameter of 18 mm and a height of 65 mm were produced. For the production, lithium cobalt oxide ($LiCoO_2$) was used as the positive electrode active material. A heat-resistant insulating layer comprising an inorganic oxide filler and a resin component was formed on the negative electrode surface. The produced batteries were subjected to nail penetration test to check the temperature increase of a shorted point 0.5 second after the penetration of a nail.

In this experiment, a thermocouple was attached to the surface of each battery. A nail was penetrated near the thermocouple, and the surface temperature of the battery was measured. The results are shown in Table 1.

TABLE 1

| Battery | Temperature of shorted point (° C.) |
| --- | --- |
| Cylindrical battery 1 | 205 |
| Cylindrical battery 2 | 203 |
| Cylindrical battery 3 | 201 |
| Cylindrical battery 4 | 205 |
| Cylindrical battery 5 | 216 |
| Cylindrical battery 6 | 203 |
| Cylindrical battery 7 | 208 |
| Cylindrical battery 8 | 204 |
| Cylindrical battery 9 | 210 |
| Cylindrical battery 10 | 201 |

The 18650 type cylindrical non-aqueous electrolyte secondary batteries used in EXPERIMENT 1 were each produced in the following procedure.

(i) Production of Positive Electrode

A positive electrode material mixture paste was prepared by mixing, in a double blade mixer, 3 kg of lithium cobalt oxide ($LiCoO_2$), 1 kg of PVDF #1320 available from Kureha Chemical Industry Co., Ltd (an N-methyl-2-pyrrolidone (NMP) solution containing 12 wt % PVDF as the binder), 90 g of acetylene black and an appropriate amount of NMP. The prepared paste was then applied onto both surfaces of an aluminum foil having a thickness of 15 μm, followed by drying and rolling to form positive electrode material mixture layers. An electrode plate which comprises the aluminum foil and the positive electrode material mixture layers had a thickness of 160 μm. The obtained electrode plate was then cut into a size suitable for a battery case for 18650 type cylindrical battery with a diameter of 18 mm and a height of 65 mm. Thereby, a positive electrode was produced.

(ii) Production of Negative Electrode

A negative electrode material mixture paste was prepared by mixing, in a double blade mixer, 3 kg of artificial graphite, 75 g of BM-400B available from Zeon Corporation, Japan (an aqueous dispersion containing 40 wt % styrene-butadiene copolymer), 30 g of carboxymethylcellulose (CMC) as the thickener and an appropriate amount of water. The prepared paste was then applied onto both surfaces of a copper foil having a thickness of 10 μm, followed by drying and rolling to form negative electrode material mixture layers. An electrode plate comprising the copper foil and the negative electrode material mixture layers had a thickness of 180 μm. The obtained electrode plate was then cut into a size suitable for the same battery case as mentioned above. Thereby, a negative electrode was produced.

(iii) Preparation of Non-Aqueous Electrolyte

Lithium Hexafluorophosphate ($LiPF_6$) was dissolved in a solvent mixture of ethylene carbonate and methyl ethyl carbonate at a volume ratio of 1:3 at a $LiPF_6$ concentration of 1 mol/L to prepare a non-aqueous electrolyte.

(iv) Preparation of Paste for Heat-Resistant Insulating Layer

A paste for the heat-resistant insulating layer was prepared by mixing, in a double blade mixer, 950 g of alumina (inorganic oxide filler) having an average particle size (median size) of 0.3 μm, 625 g of BM-720H available from Zeon Corporation, Japan (an NMP solution containing 8 wt % rubbery polymer containing an acrylonitrile unit as the resin component) and an appropriate amount of NMP.

(v) Assembly of Battery

The paste for the heat-resistant insulating layer was applied onto both surfaces of the negative electrode, followed by drying to form heat-resistant insulating layers each having a thickness of 0.5 μm.

The positive electrode and the negative electrode having 0.5 μm thick heat-resistant insulating layers formed on both surfaces thereof were spirally wound with a separator interposed between the positive and negative electrodes so as to form an electrode assembly. The separator was a 20 μm thick monolayer separator made of polyethylene resin. The electrode assembly was inserted into a battery case, and then 5.5 g of the non-aqueous electrolyte was injected into the battery case. Finally, the opening of the case was sealed. Thereby, a cylindrical non-aqueous electrolyte secondary battery having a nominal capacity of 2000 mAh was produced.

Nail penetration test was performed as follows.

Each of the cylindrical batteries 1 to 10 was charged under the following conditions:
constant current charge: 1400 mA (with an end-of-charge voltage of 4.25 V); and
constant voltage charge: 4.25 V (with an end-of-charge current of 100 mA).

The charged battery was pierced from the side thereof with a round iron nail having a diameter of 2.7 mm at a rate of 5 mm/sec. in an environment of 20° C. Then, the temperature of the shorted point (i.e., the temperature of the area through which the nail penetrated) was measured 0.5 second after the penetration of the nail.

As can be seen from Table 1, the temperature of the shorted point increased to 200° C. at the minimum for 0.5 second. It is generally accepted that lithium cobalt oxide in a charged state starts to thermally decompose at about 200° C. It can thus be surmised that under the conditions where multiple shorted points occur simultaneously as in the nail penetration test, the Joule heat continuously generates at the shorted points by current flow and therefore the decomposition reaction heat of the positive electrode active material occurs. This suggests that conventional batteries having a heat-resistant insulating layer comprising an inorganic oxide filler and a resin component cannot ensure safety under the conditions where multiple simultaneous internal short-circuits occur.

The foregoing illustrates that in order to ensure safety even under the conditions where multiple simultaneous internal short-circuits occur, it is very important to control the thermal stability of the positive electrode material. To be more specific, it is important not only to prevent short-circuiting by forming the heat-resistant insulating layer, but also to reduce thermal decomposition reaction of the positive electrode active material. Therefore, it can be concluded that the positive electrode active material should be a material that does not easily decompose even when the shorted point reaches a high temperature of 200° C. or higher.

Experiment 2
Investigation of Positive Electrode Active Material

Because it has been shown that the heat-resistant insulating layer and the thermal stability of the positive electrode active material are two very important factors, an investigation was conducted on the thermal stability of the positive electrode material mixture. In this experiment, the estimated heat generation rate at 200° C. of positive electrode material mixtures containing positive electrode materials 1 to 3 listed in Table 2 were measured.

TABLE 2

| Positive electrode material 1 | $LiMn_{1/3}Ni_{1/3}Co_{1/3}O_2$ |
| Positive electrode material 2 | $LiAl_{0.05}Ni_{0.8}Co_{0.15}O_2$ |
| Positive electrode material 3 | $LiCoO_2$ |

Using the materials 1 to 3 listed in Table 2 as the positive electrode active material, three different 18650 type cylindrical non-aqueous electrolyte secondary batteries were produced in the same manner as in EXPERIMENT 1. The produced batteries (hereinafter referred to as batteries 1A to 3A) were charged under the following conditions:

constant current charge: 1400 mA (with an end-of-charge voltage of 4.25 V); and constant voltage charge: 4.25 V (with an end-of-charge current of 100 mA). The battery voltage 4.25 V corresponds to positive electrode potential of 4.35 V vs Li metal.

The charged batteries 1A to 3A were disassembled in an atmosphere with a dew point of not greater than −40° C., and then the positive electrode was removed from each battery. The removed positive electrodes were cut into sample pieces each with a size of 3 cm×6 cm. Each of the sample pieces was inserted into a cylindrical iron case (with a diameter of 8 mm and a height of 65 mm) with the inner surface plated with Ni. Then, the opening of each case was sealed.

Subsequently, the positive electrode sample pieces enclosed in the hermetically sealed cylindrical cases were analyzed by an accelerating rate calorimeter (ARC) under the conditions shown in Table 3 to obtain data on the relation between absolute temperature T and heat generation rate V of the positive electrode material mixture.

TABLE 3

| Start temperature | 60° C. |
| End temperature | 460° C. |
| Heat step (temperature increment) | 20° C. |
| Detection sensitivity | 0.04° C./min. |

TABLE 3-continued

| Wait time | 15 min. |
| Detection temperature difference | 0.2° C. |

In the ARC test, because a sample is held in an adiabatic atmosphere, the temperature increasing rate of the sample directly reflects the heat generation. The sample is given a temperature rise by stepwise heating until the heat generation reaction has a heat generation rate over the set predetermined detection sensitivity. Once the ARC detects a heat generation rate over the set detection sensitivity, it measures the heat generation rate of the sample in an adiabatic atmosphere.

Figure 2:
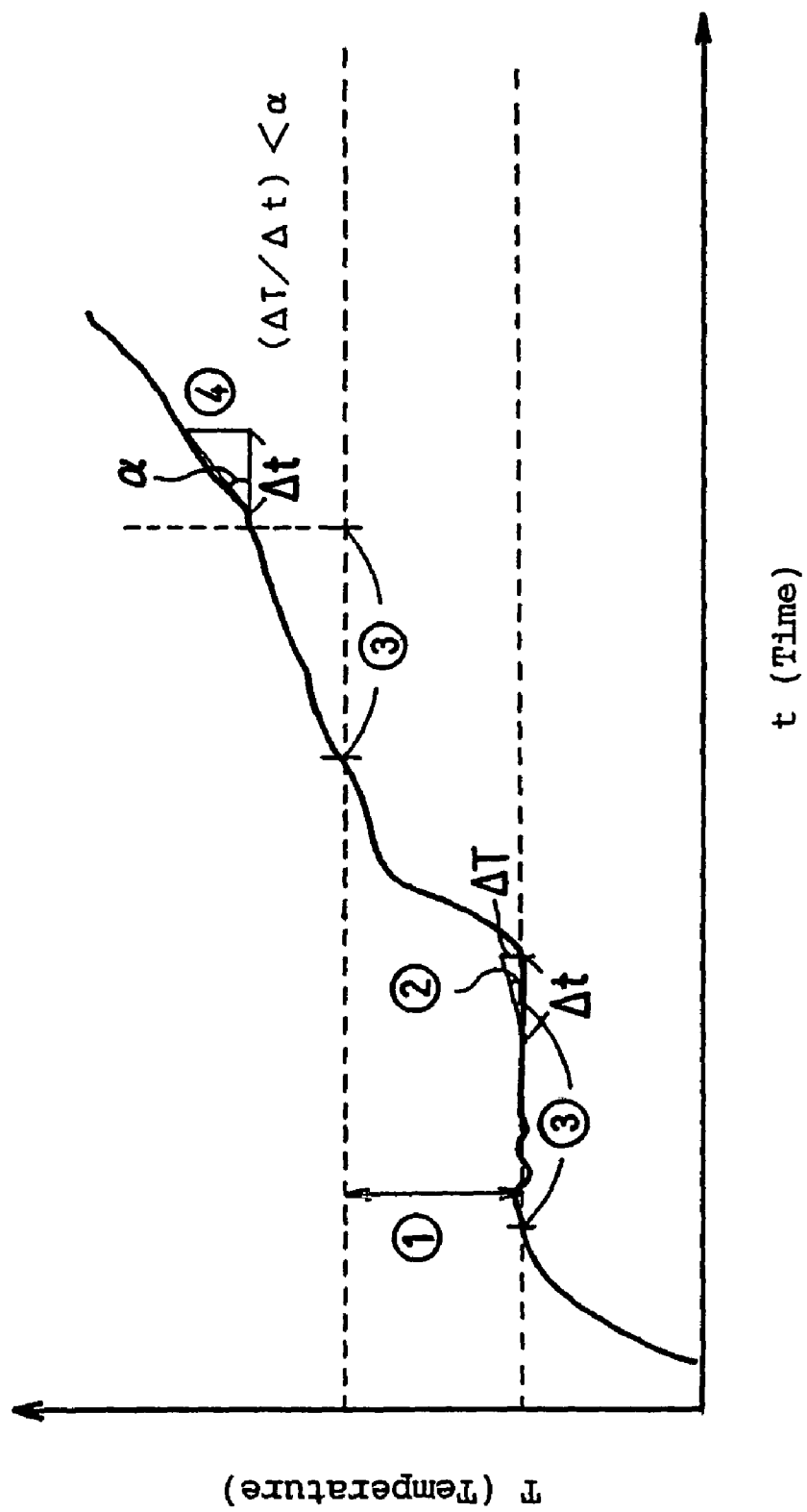
FIG. 2 is a graph used to explain the measuring principle of ARC.

The terms listed in Table 3 are defined below with reference to FIG. 2.

Heat step (indicated by ① in FIG. 2): an increment of the atmospheric temperature increased stepwise within a range where self-heating of the sample is not detected.

Detection sensitivity (indicated by ② in FIG. 2): a sensitivity level at which self-heating of the sample is detected. The sensitivity can be arbitrarily set according to the material used. When a temperature increment by self-heating of the sample within detection time ($\Delta t$) is taken as $\Delta T$, the sensitivity is expressed by $\Delta T/\Delta t$.

Wait time (indicated by ③ in FIG. 2): a time period after the atmospheric temperature is increased compulsory by a certain temperature increment for allowing the sample temperature and the atmospheric temperature in the sample container to be stable. The wait time can be arbitrarily set.

Detection temperature difference (indicated by ④ in FIG. 2): a temperature difference by which self-heating of the sample is detected. Under the conditions where the detection temperature difference is 0.2° C. and the detection sensitivity is 0.04° C./min., if a temperature increase at a rate of not less than 0.04° C./min. continues for 5 minutes (0.2/0.04), the ARC will recognize that heat generation has occurred.

Conventionally, thermoanalysis such as differential scanning calorimetry (DSC) and thermogravimetry-differential thermal analysis (TG-DTA) have been employed for thermal stability measurement of positive electrode active materials. However, the thermal stability measurements by DSC and TG-DTA suffer from a few problems, one of which is that heat generation rate or heat generation peak varies according to the measurement conditions (e.g., the temperature increase rate, the amount of the sample). Thus, the use of DSC and TG-DTA is not suitable for accurate measurement of the heat generation rate. Another problem is that, in the event of internal short-circuit or the like, the temperature of a shorted point will instantly increase to 200° C. or higher. Therefore, heat that would have been generated at temperatures of less than 200° C. will also be generated simultaneously. The DSC and TG-DTA measurements, however, cannot predict the heat generation rate of a heat generation reaction at different temperatures. On the other hand, in the ARC test, because the sample is held in an adiabatic atmosphere, the temperature increasing rate of the sample indicates the heat generation rate as it is. For this reason, the ARC test is particularly effective in measuring the reaction rate of an exothermic reaction. In view of the above, in the present invention, an accelerating rate calorimeter (ARC) was used for measuring the thermal stability of the positive electrode material mixtures at the time of internal short-circuit.

The data obtained by ARC was plotted according to the Arrhenius law as shown in FIG. 1. More specifically, the relation between the inverse of absolute temperature T (X coordinate) and the logarithm of heat generation rate V (Y coordinate) was plotted. An approximate straight line was drawn such that it fits to a set of the plotted points. Each point showed the heat generation rate of a chemical reaction. By extrapolating the approximate straight line to a certain temperature axis, it is possible to estimate the heat generation rate outside the range of the temperature at which heat generation is actually observed. In this experiment, as shown in FIG. 1, a straight line was drawn to be fitted to the plotted points in the heat generation range of T<200° C. (473 K). Then, the straight line was extrapolated to the temperature axis at T=200° C. (473 K) to determine an estimated heat generation rate. The estimated heat generation rates thus obtained are shown in Table 4.

TABLE 4

| Positive electrode material 1 | $LiMn_{1/3}Ni_{1/3}Co_{1/3}O_2$ | 10 W/kg |
|---|---|---|
| Positive electrode material 2 | $LiAl_{0.05}Ni_{0.8}Co_{0.15}O_2$ | 100 W/kg |
| Positive electrode material 3 | $LiCoO_2$ | 2500 W/kg |

The batteries 1A to 3A were subjected to the same nail penetration test as in EXPERIMENT 1. As a result, only in the battery 1A containing the positive electrode material 1 ($LiMn_{1/3}Ni_{1/3}Co_{1/3}O_2$), the temperature of the shorted point immediately after the penetration of the nail did not reach 200° C. Comparison of the battery voltage between before and after the nail penetration test showed that the battery voltage after the test was almost the same as before. The maximum temperature of the battery surface (i.e., the area apart from the shorted point) did not reach 80° C. throughout the test. The foregoing indicates that the shorted point was successfully insulated after the occurrence of internal short-circuit, which minimized the Joule heat generation.

From the above results, it is clear that when the positive electrode material has a certain thermal stability (i.e., an estimated heat generation rate at 200° C. determined by the ARC measurement of 10 W/kg), the battery can ensure safety even under the conditions where multiple simultaneous internal short-circuits occur. This is caused by the synergistic effect between the action of the heat-resistant insulating layer and the thermal stability of the positive electrode material. Presumably, this synergistic effect contributed to the achievement of a battery with an unprecedented level of safety. Although it has been considered impossible to reduce the battery temperature to less than 80° C. under the conditions where multiple shorted points occur simultaneously, the foregoing has clearly illustrated that it is possible according to the present invention.

Hereinafter, a description will be given of examples.
Batteries X1 to X18 and Batteries Y1 to Y12

Thirty different 18650 type cylindrical non-aqueous electrolyte secondary batteries (hereinafter referred to as batteries X1 to X18 and Y1 to Y12) were produced in the same manner as in EXPERIMENT 1 except that the positive electrode materials listed in Table 5 were used, that the heat-resistant insulating layer was formed on both surfaces (except Batteries X7 to X12, X16 to X18, Y3, Y4, Y8, Y11 and Y12) of those as listed in Table 5, and that the thickness of the dried heat-resistant insulating layer formed on each surface was set as listed in Table 5. Note that the positive electrode materials 1 to 3 had compositions shown in Table 2, and that the positive electrode materials A to E had compositions shown below.

Positive electrode material A: a mixture containing 90 wt % of positive electrode material 1 and 10 wt % of positive electrode material 2.

Positive electrode material B: a mixture containing 80 wt % of positive electrode material 1 and 20 wt % of positive electrode material 2.

Positive electrode material C: a mixture containing 70 wt % of positive electrode material 1 and 30 wt % of positive electrode material 2.

Positive electrode material D: a mixture containing 60 wt % of positive electrode material 1 and 40 wt % of positive electrode material 2.

Positive electrode material E: a mixture containing 50 wt % of positive electrode material 1 and 50 wt % of positive electrode material 2.

In the production of batteries X7 to X12, X16 to X18, Y3, Y4, Y8, Y11 and Y12, as the heat-resistant insulating layer, a 0.5 to 5 µm thick film made of aramid resin and an inorganic oxide filler as disclosed by Japanese Laid-Open Patent Publication No. Hei 9-208736 was formed on only one surface of a separator. The formation of the heat-resistant insulating layer is described in detail below.

A separable flask equipped with a stirring blade, a thermometer, a nitrogen feed pipe and a powder inlet was thoroughly dried. Into the dried separable flask was introduced 4200 g of NMP and 270 g of calcium chloride having dried at 200° C. for two hours, which was then heated to 100° C. After the calcium chloride was thoroughly dissolved, the temperature in the flask was decreased back to 20±2° C., and 130 g of para-phenylenediamine (PPD) was added and dissolved thoroughly. Then, 24 g of dichloroterephthate (TPC) was added to the solution, which was kept at 20±2° C., every five minutes (10 additions and 240 g in total). The resulting solution was allowed to sit for one hour for aging, which was then stirred for 30 minutes under a reduced pressure for degassing to obtain a polymer solution of polyparaphenylene terephthalamide (PPTA: with a thermal decomposition temperature of not less than 400° C., amorphous).

To the polymer solution was slowly added an NMP solution having 5.8 wt % calcium chloride dissolved therein until the concentration of PPTA reached 2.8 wt %. Alumina particles having an average particle size of 0.5 µm were further added thereto to prepare a paste comprising PPTA solution and alumina at a weight ratio of 97:3. The obtained paste was applied onto one surface of a separator using a bar coater, which was then dried with hot air at 80° C. The resulting separator was washed with ion exchange water to remove calcium chloride. Thereby, a separator having a heat-resistant insulating layer comprising PPTA was produced. In the production of an electrode assembly, the heat-resistant insulating layer was disposed such that the layer came in contact with the positive electrode.

In the production of batteries Y5 and Y6, no heat-resistant insulating layer was formed.

In the same manner as in EXPERIMENT 2, the estimated heat generation rate at 200° C. of the positive electrode material mixture for the batteries X1 to X18 and Y1 to Y12 was determined. The results are shown in Table 5.

Further, the batteries X1 to X18 and Y1 to Y12, ten of each, were subjected to the same nail penetration test as in EXPERIMENT 1 to check the maximum battery surface temperature apart from the shorted point. With respect to the ten batteries of each EXAMPLE, the average of the maximum battery surface temperature of batteries whose temperature did not reach 80° C. was calculated, and the number of batteries whose temperature reached 80° C. was counted. When the maximum battery surface temperatures of the ten batteries were all 80° C. or higher, they are expressed as "not less than 80" in Table 5. The results are shown in Table 5.

TABLE 5

| | Positive electrode material | Estimated heat generation rate (W/kg) | Location where heat-resistant insulating layer is formed | Heat-resistant insulating layer thickness (μm) | Number of batteries that reached 80° C. | Maximum battery surface temperature (° C.) |
|---|---|---|---|---|---|---|
| Battery Y1 | 1 | 10 | Negative electrode surface | 0.5 | 3 | 52 |
| Battery X1 | 1 | 10 | Negative electrode surface | 1 | 1 | 33 |
| Battery X2 | 1 | 10 | Negative electrode surface | 2.5 | 1 | 33 |
| Battery X3 | 1 | 10 | Negative electrode surface | 3 | 0 | 30 |
| Battery X4 | 1 | 10 | Negative electrode surface | 5 | 0 | 30 |
| Battery X5 | 1 | 10 | Negative electrode surface | 10 | 0 | 29 |
| Battery X6 | 1 | 10 | Negative electrode surface | 15 | 0 | 29 |
| Battery Y2 | 1 | 10 | Negative electrode surface | 17 | 3 | 45 |
| Battery Y3 | 1 | 10 | Separator surface | 0.5 | 3 | 58 |
| Battery X7 | 1 | 10 | Separator surface | 1 | 1 | 39 |
| Battery X8 | 1 | 10 | Separator surface | 1.7 | 0 | 36 |
| Battery X9 | 1 | 10 | Separator surface | 5 | 0 | 35 |
| Battery X10 | 1 | 10 | Separator surface | 6.7 | 0 | 36 |
| Battery X11 | 1 | 10 | Separator surface | 10 | 1 | 38 |
| Battery X12 | 1 | 10 | Separator surface | 15 | 1 | 40 |
| Battery Y4 | 1 | 10 | Separator surface | 17 | 3 | 54 |
| Battery X13 | A | 15 | Negative electrode surface | 5 | 0 | 35 |
| Battery X14 | B | 33 | Negative electrode surface | 5 | 0 | 38 |
| Battery X15 | C | 46 | Negative electrode surface | 5 | 0 | 42 |
| Battery X16 | A | 15 | Separator surface | 5 | 0 | 39 |
| Battery X17 | B | 33 | Separator surface | 5 | 0 | 42 |
| Battery X18 | C | 46 | Separator surface | 5 | 0 | 43 |
| Battery Y5 | 2 | 100 | Not formed | — | 10 | not less than 80 |
| Battery Y6 | 1 | 10 | Not formed | — | 10 | not less than 80 |
| Battery Y7 | 3 | 2500 | Negative electrode surface | 5 | 10 | not less than 80 |
| Battery Y8 | 3 | 2500 | Separator surface | 5 | 10 | not less than 80 |
| Battery Y9 | D | 61 | Negative electrode surface | 5 | 10 | not less than 80 |
| Battery Y10 | E | 72 | Negative electrode surface | 5 | 10 | not less than 80 |
| Battery Y11 | D | 61 | Separator surface | 5 | 10 | not less than 80 |
| Battery Y12 | E | 72 | Separator surface | 5 | 10 | not less than 80 |

Positive electrode material 1: $LiMn_{1/3}Ni_{1/3}Co_{1/3}O_2$
Positive electrode material 2: $LiAl_{0.05}Ni_{0.8}Co_{0.15}O_2$
Positive electrode material 3: $LiCoO_2$
Positive electrode material A: Positive electrode material 1/Positive electrode material 2 = 90/10 (wt %)
Positive electrode material B: Positive electrode material 1/Positive electrode material 2 = 80/20 (wt %)
Positive electrode material C: Positive electrode material 1/Positive electrode material 2 = 70/30 (wt %)
Positive electrode material D: Positive electrode material 1/Positive electrode material 2 = 60/40 (wt %)
Positive electrode material E: Positive electrode material 1/Positive electrode material 2 = 50/50 (wt %)

The test results are discussed below.

The results of Batteries Y5 and Y6 indicate that, even when the positive electrode active material having relatively higher thermal stability than lithium cobalt oxide is used, unless the heat-resistant insulating layer is formed, the maximum battery surface temperature cannot be reduced to less than 80° C. under the conditions where multiple simultaneous internal short-circuits occur.

As can be seen from the results of Batteries Y7 to Y12, even the battery having the heat-resistant insulating layer cannot interrupt the chain of heat generation reaction when the battery contains a positive electrode active material having an estimated heat generation rate of over 50 W/kg. Thus, the maximum battery surface temperature cannot be reduced to less than 80° C.

Comparisons between the results of Batteries X13 to X18 and those of Batteries Y9 to Y12 show that the heat-resistant insulating layer can exhibit its action in the most effective manner when a positive electrode active material having an estimated heat generation rate of not greater than 50 W/kg is used. When the estimated heat generation rate is greater than 50 W/kg, the maximum battery surface temperature increases significantly. When the estimated heat generation rate is not greater than 50 W/kg, the chain of heat generation reaction can be effectively interrupted, and the heat generated at the shorted point can be diffused efficiently.

It can be seen from the results of Batteries X1 to X6 that if the heat-resistant insulating layer has a certain thickness, the thickness of the heat-resistant insulating layer does not significantly affect the effect of reducing the maximum battery surface temperature under the conditions where multiple simultaneous short-circuits occur. The maximum battery surface temperature decreased as the thickness of the heat-resistant insulating layer was increased. However, when the heat-resistant insulating layer is too thick, it will be difficult to maintain a high energy density of the battery, and the heat-resistant insulating layer may break upon winding. Since the heat-resistant insulating layer is brittle, if it is too thick, it partially separates from the electrode surface or the separator surface upon winding. This can be confirmed from the fact that the number of batteries whose temperature reached 80° C or higher was particularly large in Battery Y2. Thus, even when a positive electrode active material with high thermal stability is used, a high degree of safety cannot be maintained in nail penetration test.

Accordingly, the thickness of the heat-resistant insulating layer may be, for example, about 1 to 15 μm, or 3 to 10 μm. Similar results were also obtained in Batteries X7 to X12 in which the heat-resistant insulating layer was formed on the separator surface. The thickness of the heat-resistant insulating layer containing aramid resin may be, for example, 1.7 to 6.7 μm.

When the thickness of the heat-resistant insulating layer is less than 1 μm, the mechanical strength thereof will be low, which means that the heat-resistant insulating layer can be easily damaged by the impact associated with a short-circuit. This can be confirmed from the fact that the number of batteries whose temperature reached 80° C. or higher was particularly large in Batter Y1. Accordingly, when the thickness of the heat-resistant insulating layer is reduced to less than 1 μm, the insulation function will degrade to a certain extent.

Batteries X19A to X30A and Battery Y13A

Thirteen different 18650 type cylindrical non-aqueous electrolyte secondary batteries (hereinafter referred to as batteries X19A to X30A and Battery Y13A were produced in the same manner as in EXPERIMENT 1 except that the positive electrode materials listed in Table 6-1 were used, that the heat-resistant insulating layer was formed on both surfaces of those listed in Table 6-1, and that the thickness of the dried heat-resistant insulating layer formed on each surface was set to those listed in Table 6-1.

Batteries X19B to X30B and Battery Y13B

Thirteen different 18650 type cylindrical non-aqueous electrolyte secondary batteries (hereinafter referred to as batteries X19B to X30B and Batteries Y13B) were produced in the same manner as in EXPERIMENT 1 except that the positive electrode materials as listed in Table 6-2 were used, that the heat-resistant insulating layer was formed as listed in Table 6-2, that the thickness of the dried heat-resistant insulating layer was set to those listed in Table 6-2, and that a 5-μm-thick film comprising aramid resin and an inorganic oxide filler, which was disclosed in the EXAMPLE of Japanese Laid-Open Patent Publication No. Hei 9-208736, was formed on only one surface of the separator as the heat-resistant insulating layer as in Battery X9.

Note that, as the positive electrode materials 4 to 13, composite lithium oxides having compositions ($LiM_bNi_dCo_eO_2$) shown in Table 7 were used, and that the positive electrode materials F to H had compositions shown below.

Positive electrode material F: a mixture containing 90 wt % of positive electrode material 1 and 10 wt % of positive electrode material 3.

Positive electrode material G: a mixture containing 80 wt % of positive electrode material 1 and 20 wt % of positive electrode material 3.

Positive electrode material H: a mixture containing 70 wt % of positive electrode material 1 and 30 wt % of positive electrode material 3.

TABLE 6-1

| Battery | Positive electrode material | Estimated heat generation rate (W/kg) | Location where heat-resistant insulating layer is formed | Heat-resistant insulating layer thickness (μm) | Maximum battery surface temperature (° C.) |
| --- | --- | --- | --- | --- | --- |
| X19A | F | 24 | Negative electrode surface | 5 | 55 |
| X20A | G | 49 | Negative electrode surface | 5 | 62 |
| X21A | 4 | 47 | Negative electrode surface | 5 | 61 |
| X22A | 5 | 35 | Negative electrode surface | 5 | 57 |
| X23A | 6 | 40 | Negative electrode surface | 5 | 59 |
| X24A | 7 | 41 | Negative electrode surface | 5 | 59 |
| X25A | 8 | 34 | Negative electrode surface | 5 | 57 |
| X26A | 9 | 37 | Negative electrode surface | 5 | 57 |
| X27A | 10 | 38 | Negative electrode surface | 5 | 58 |
| X28A | 11 | 45 | Negative electrode surface | 5 | 61 |
| X29A | 12 | 42 | Negative electrode surface | 5 | 60 |
| X30A | 13 | 42 | Negative electrode surface | 5 | 60 |
| Y13A | H | 72 | Negative electrode surface | 5 | not less than 80 |

TABLE 6-2

| Battery | Positive electrode material | Estimated heat generation rate (W/kg) | Location where heat-resistant insulating layer is formed | Heat-resistant insulating layer thickness (μm) | Maximum battery surface temperature (° C.) |
| --- | --- | --- | --- | --- | --- |
| X19B | F | 24 | Separator surface | 5 | 59 |
| X20B | G | 49 | Separator surface | 5 | 67 |
| X21B | 4 | 47 | Separator surface | 5 | 65 |
| X22B | 5 | 35 | Separator surface | 5 | 63 |
| X23B | 6 | 40 | Separator surface | 5 | 63 |
| X24B | 7 | 41 | Separator surface | 5 | 62 |
| X25B | 8 | 34 | Separator surface | 5 | 61 |
| X26B | 9 | 37 | Separator surface | 5 | 62 |
| X27B | 10 | 38 | Separator surface | 5 | 62 |
| X28B | 11 | 45 | Separator surface | 5 | 66 |
| X29B | 12 | 42 | Separator surface | 5 | 64 |
| X30B | 13 | 42 | Separator surface | 5 | 65 |
| Y13B | H | 72 | Separator surface | 5 | not less than 80 |

TABLE 7

| Composition | $LiMn_{0.27}M^1_{0.03}Ni_{0.5}Co_{0.2}O_2$ | | | |
| --- | --- | --- | --- | --- |
| Atomic ratio | 0.27 | 0.03 | 0.5 | 0.2 |
| Positive electrode material 4 | Mn | Mn | Ni | Co |
| Positive electrode material 5 | Mn | Al | Ni | Co |

TABLE 7-continued

| Composition | LiMn$_{0.27}$M$^1_{0.03}$Ni$_{0.5}$Co$_{0.2}$O$_2$ | | | |
|---|---|---|---|---|
| Atomic ratio | 0.27 | 0.03 | 0.5 | 0.2 |
| Positive electrode material 6 | Mn | Cu | Ni | Co |
| Positive electrode material 7 | Mn | Mg | Ni | Co |
| Positive electrode material 8 | Mn | Ti | Ni | Co |
| Positive electrode material 9 | Mn | Zn | Ni | Co |
| Positive electrode material 10 | Mn | Mo | Ni | Co |
| Positive electrode material 11 | Mn | Sn | Ni | Co |
| Positive electrode material 12 | Mn | In | Ni | Co |
| Positive electrode material 13 | Mn | Fe | Ni | Co |

In the same manner as in EXPERIMENT 2, the estimated heat generation rate at 200° C. of the positive electrode material mixture was determined. The results are shown in Tables 6-1 and 6-2.

Further, the batteries X19A to X30A, X19B to X30B, Y13A and Y13B, ten of each, were subjected to the same nail penetration test as in EXPERIMENT 1 to check the maximum battery surface temperature. The average of the maximum battery surface temperature of ten batteries was calculated. The results are shown in Tables 6-1 and 6-2. The maximum battery surface temperatures of the ten batteries were all below 80° C.

The test results are discussed below.

The comparison of the results of Battery X21A and Batteries X22A to X30A and the comparison of the results of Battery X21B and Batteries X22B to X30B indicates that, Al, Sn, In, Fe, Cu, Mg, Ti, Zn and Mo have the effect of reducing the estimated heat generation rate. When using a composite lithium oxide comprising Mn (the element M) and other element M$^1$ as listed in Table 7, the molar ratio (atomic ratio) of Mn and the element M$^1$ is preferably 99:1 to 50:50, more preferably 97:3 to 90:10.

The addition of lithium cobalt oxide (i.e., positive electrode material 3) to the active material produces a high energy density positive electrode, and therefore the addition of lithium cobalt oxide is preferred from the view point of achieving a high capacity battery. However, batteries using the positive electrode material H, 30 wt % of which was positive electrode material 3, were unsatisfactory in terms of safety in the nail penetration test. Accordingly, when lithium cobalt oxide is used together with other positive electrode material, the amount of lithium cobalt oxide is preferably not greater than 20 wt % of the total amount of the active material.

Batteries X31A to X41A

Eleven different 18650 type cylindrical non-aqueous electrolyte secondary batteries (hereinafter referred to as batteries X31A to X41A) were produced in the same manner as in EXPERIMENT 1 except that the positive electrode materials 14 to 24 (composite lithium oxides having a composition of LiCo$_{0.98}$M$_{0.02}$O$_2$) listed in Table 8-1 were used, and that a heat-resistant insulating layer comprising aramid resin and an inorganic oxide filler was formed on a separator such that the dried layer had a thickness of 5 μm as in Battery X9. In the same manner as in EXPERIMENT 2, the estimated heat generation rate at 200° C. of the positive electrode material mixture was determined. Further, the batteries X31A to X41A, ten of each, were subjected to the nail penetration test, and the average of the maximum battery surface temperature of ten batteries was calculated. The results are shown in Table 8-1. The maximum battery surface temperatures of the ten batteries were all below 80° C.

Batteries X31B to X41B

Eleven different 18650 type cylindrical non-aqueous electrolyte secondary batteries (hereinafter referred to as batteries X31B to X41B) were produced in the same manner as in EXPERIMENT 1 except that the positive electrode materials 14 to 24 (composite lithium oxides having a composition of LiCo$_{0.98}$M$_{0.02}$O$_2$) listed in Table 8-2 were used, and that a heat-resistant insulating layer comprising an inorganic oxide filler and BM-720H was formed on both surfaces of the negative electrode such that the dried layer had a thickness of 5 μm as in Battery X4. In the same manner as in EXPERIMENT 2, the estimated heat generation rate at 200° C. of the positive electrode material mixture was determined. Further, the batteries X31B to X41B, ten of each, were subjected to the nail penetration test, and the average of the maximum battery surface temperature of ten batteries was calculated. The results are shown in Table 8-2. The maximum battery surface temperatures of the ten batteries were all below 80° C.

TABLE 8-1

| | Composition | LiCo$_{0.98}$M$_{0.02}$O$_2$ | | Estimated heat generation rate (W/kg) | Maximum battery surface temperature (° C.) |
|---|---|---|---|---|---|
| | Atomic ratio | 0.98 | 0.02 | | |
| X31A | Positive electrode material 14 | Co | Mn | 47 | 70 |
| X32A | Positive electrode material 15 | Co | Al | 42 | 63 |
| X33A | Positive electrode material 16 | Co | Cu | 46 | 65 |
| X34A | Positive electrode material 17 | Co | Mg | 46 | 65 |
| X35A | Positive electrode material 18 | Co | Ti | 38 | 61 |
| X36A | Positive electrode material 19 | Co | Zn | 42 | 63 |
| X37A | Positive electrode material 20 | Co | Mo | 43 | 65 |
| X38A | Positive electrode material 21 | Co | Sn | 47 | 69 |
| X39A | Positive electrode material 22 | Co | In | 47 | 67 |
| X40A | Positive electrode material 23 | Co | Fe | 46 | 67 |
| X41A | Positive electrode material 24 | Co | Zr | 36 | 60 |

TABLE 8-2

| | Composition | LiCo$_{0.98}$M$_{0.02}$O$_2$ | | Estimated heat generation rate (W/kg) | Maximum battery surface temperature (° C.) |
|---|---|---|---|---|---|
| | Atomic ratio | 0.98 | 0.02 | | |
| X31B | Positive electrode material 14 | Co | Mn | 47 | 67 |
| X32B | Positive electrode material 15 | Co | Al | 42 | 61 |
| X33B | Positive electrode material 16 | Co | Cu | 46 | 60 |
| X34B | Positive electrode material 17 | Co | Mg | 46 | 61 |
| X35B | Positive electrode material 18 | Co | Ti | 38 | 58 |

TABLE 8-2-continued

| | Composition | $LiCo_{0.98}M_{0.02}O_2$ | | Estimated heat generation rate (W/kg) | Maximum battery surface temperature (°C.) |
|---|---|---|---|---|---|
| | Atomic ratio | 0.98 | 0.02 | | |
| X36B | Positive electrode material 19 | Co | Zn | 42 | 60 |
| X37B | Positive electrode material 20 | Co | Mo | 43 | 61 |
| X38B | Positive electrode material 21 | Co | Sn | 47 | 65 |
| X39B | Positive electrode material 22 | Co | In | 47 | 64 |
| X40B | Positive electrode material 23 | Co | Fe | 46 | 65 |
| X41B | Positive electrode material 24 | Co | Zr | 36 | 58 |

The results of Table 8 show that Mn, Al, Sn, In, Fe, Cu, Mg, Ti, Zn, Zr and Mo have the effect of reducing the estimated heat generation rate. Even when the composition was based on the positive electrode material 3, the addition of the element M reduced the estimated heat generation rate at 200° C. to not greater than 50 W/kg. Moreover, the synergistic effect between the element M and the heat-resistant insulating layer significantly improved the nail penetration safety.

Batteries X42A to X52A

Eleven different 18650 type cylindrical non-aqueous electrolyte secondary batteries (hereinafter referred to as batteries X42A to X52A) were produced in the same manner as in EXPERIMENT 1 except that the positive electrode materials 25 to 35 listed in Table 9-1 were used, and that a heat-resistant insulating layer comprising aramid resin and an inorganic oxide filler was formed on a separator such that the dried layer had a thickness of 5 µm as in Battery X9. In the same manner as in EXPERIMENT 2, the estimated heat generation rate at 200° C. of the positive electrode material mixture was determined. Further, the batteries X42A to X52A, ten of each, were subjected to the nail penetration test, and the average of the maximum battery surface temperature of ten batteries was calculated. The results are shown in Table 9-1. The maximum battery surface temperatures of the ten batteries were all below 80° C.

Batteries X42B to X52B

Eleven different 18650 type cylindrical non-aqueous electrolyte secondary batteries (hereinafter referred to as batteries X42B to X52B) were produced in the same manner as in EXPERIMENT 1 except that the positive electrode materials 25 to 35 listed in Table 9-2 were used, and that a heat-resistant insulating layer comprising an inorganic oxide filler and BM-720H was formed on both surfaces of the negative electrode such that the dried layer had a thickness of 5 µm as in Battery X4. In the same manner as in EXPERIMENT 2, the estimated heat generation rate at 200° C. of the positive electrode material mixture was determined. Further, the batteries X42B to X52B, ten of each, were subjected to the nail penetration test, and the average of the maximum battery surface temperature of ten batteries was calculated. The results are shown in Table 9-2. The maximum battery surface temperatures of the ten batteries were all below 80° C.

The positive electrode materials 25 to 34 were each prepared by mixing the positive electrode material 2 ($LiAl_{0.05}Ni_{0.8}Co_{0.15}O_2$) with an oxide of the element M shown in Table 9, followed by baking at 1000° C. in air atmosphere. The amount of the oxide of the element M was 0.01 mol relative to 1 mol of the positive electrode material 2. As a result, the element M diffused from the added oxide to the positive electrode material 2, and positive electrode materials 25 to 34 comprising composite lithium oxides in which the element M was distributed more in the surface portion than the inside were obtained.

The positive electrode material 35 was prepared by treating the positive electrode material 2 with vinyl trimethoxy silane serving as a silane coupling agent. In this example, the positive electrode material 2 was first impregnated with a mixture of the silane coupling agent and water at a silane coupling agent concentration of 0.1 wt %, and then dried.

TABLE 9-1

| | Composition | $LiAl_{0.05}Ni_{0.8}Co_{0.15}O_2$ Added element | Estimated heat generation rate (W/kg) | Maximum battery surface temperature (°C.) |
|---|---|---|---|---|
| X42A | Positive electrode material 25 | Mn(MnO$_4$) | 44 | 69 |
| X43A | Positive electrode material 26 | Cu(CuO) | 40 | 66 |
| X44A | Positive electrode material 27 | Mg(MgO) | 42 | 65 |
| X45A | Positive electrode material 28 | Ti(TiO) | 34 | 61 |
| X46A | Positive electrode material 29 | Zn(ZnO) | 37 | 63 |
| X47A | Positive electrode material 30 | Mo(MoO$_2$) | 39 | 65 |
| X48A | Positive electrode material 31 | Sn(SnO) | 43 | 67 |
| X49A | Positive electrode material 32 | In(In$_2$O$_3$) | 42 | 67 |
| X50A | Positive electrode material 33 | Fe(Fe$_2$O$_3$) | 45 | 68 |
| X51A | Positive electrode material 34 | Zr(ZrO) | 32 | 59 |
| X52A | Positive electrode material 35 | Si compound | 31 | 54 |

TABLE 9-2

| | Composition | $LiAl_{0.05}Ni_{0.8}Co_{0.15}O_2$ Added element | Estimated heat generation rate (W/kg) | Maximum battery surface temperature (°C.) |
|---|---|---|---|---|
| X42B | Positive electrode material 25 | Mn(MnO$_4$) | 44 | 66 |
| X43B | Positive electrode material 26 | Cu(CuO) | 40 | 64 |
| X44B | Positive electrode material 27 | Mg(MgO) | 42 | 61 |
| X45B | Positive electrode material 28 | Ti(TiO) | 34 | 58 |
| X46B | Positive electrode material 29 | Zn(ZnO) | 37 | 60 |
| X47B | Positive electrode material 30 | Mo(MoO$_2$) | 39 | 61 |
| X48B | Positive electrode material 31 | Sn(SnO) | 43 | 64 |
| X49B | Positive electrode material 32 | In(In$_2$O$_3$) | 42 | 63 |
| X50B | Positive electrode material 33 | Fe(Fe$_2$O$_3$) | 45 | 64 |
| X51B | Positive electrode material 34 | Zr(ZrO) | 32 | 56 |
| X52B | Positive electrode material 35 | Si compound | 31 | 50 |

The results of Tables 9-1 and 9-2 also show that the element M has the effect of reducing the estimated heat generation rate, in the same manner as Tables 8-1 and 8-2. Because the element M was distributed with a higher concentration in the surface portion of the active material, the effect of reducing the estimated heat generation rate was remarkable. Moreover, the synergistic effect between the element M and the heat-resistant insulating layer significantly improved the nail penetration safety. Similar results to those obtained by the addition of the element M were obtained by the treatment with the silane coupling agent.

Batteries X53A to X55A

Three different 18650 type cylindrical non-aqueous electrolyte secondary batteries (hereinafter referred to as batteries X53A to X55A) were produced in the same manner as in EXPERIMENT 1 except that positive electrode materials 36 to 38 prepared by mixing the positive electrode material 1 and the positive electrode material 24 shown below were used, and that a heat-resistant insulating layer comprising aramid resin and an inorganic oxide filler was formed on a separator such that the dried layer had a thickness of 5 μm as in Battery X9. In the same manner as in EXPERIMENT 2, the estimated heat generation rate at 200° C. of the positive electrode material mixture was determined. Further, the batteries X53A to X55A, ten of each, were subjected to the nail penetration test, and the average of the maximum battery surface temperature of ten batteries was calculated. The results are shown in Table 10-1. The maximum battery surface temperatures of the ten batteries were all below 80° C.

Batteries X53B to X55B

Three different 18650 type cylindrical non-aqueous electrolyte secondary batteries (hereinafter referred to as batteries X53B to X55B) were produced in the same manner as in EXPERIMENT 1 except that positive electrode materials 36 to 38 prepared by mixing the positive electrode materials 1 and 24 together were used, and that a heat-resistant insulating layer comprising an inorganic oxide filler and BM-720H was formed on both surfaces of the negative electrode such that the dried layer had a thickness of 5 μm as in Battery X4. In the same manner as in EXPERIMENT 2, the estimated heat generation rate at 200° C. of the positive electrode material mixture was determined. Further, the batteries X53B to X55B, ten of each, were subjected to the nail penetration test, and the average of the maximum battery surface temperature of ten batteries was calculated. The results are shown in Table 10-2. The maximum battery surface temperatures of the ten batteries were all below 80° C.

Positive electrode material 36: a mixture containing 10 wt % of positive electrode material 1 and 90 wt % of positive electrode material 24.

Positive electrode material 37: a mixture containing 50 wt % of positive electrode material 1 and 50 wt % of positive electrode material 24.

Positive electrode material 38: a mixture containing 90 wt % of positive electrode material 1 and 10 wt % of positive electrode material 24.

TABLE 10-1

| | | Estimated heat generation rate (W/kg) | Maximum battery surface temperature (°C.) |
|---|---|---|---|
| X53A | Positive electrode material 36 | 33 | 58 |
| X54A | Positive electrode material 37 | 23 | 42 |
| X55A | Positive electrode material 38 | 13 | 31 |

TABLE 10-2

|  |  | Estimated heat generation rate (W/kg) | Maximum battery surface temperature (° C.) |
|---|---|---|---|
| X53B | Positive electrode material 36 | 33 | 55 |
| X54B | Positive electrode material 37 | 23 | 38 |
| X55B | Positive electrode material 38 | 13 | 29 |

It is clear from Tables 10-1 and 10-2 that even when two different positive electrode materials, both having a reduced estimated heat-generation rate of not greater than 50 W/kg, are used together, the nail penetration safety can be improved significantly.

Batteries X56, X57 and X59

Three different 18650 type cylindrical non-aqueous electrolyte secondary batteries (hereinafter referred to as batteries X56, X57 and X59) were produced in the same manner as in EXPERIMENT 1 except that the heat-resistant insulating layer was formed on those listed in Table 11. Note that when the heat-resistant insulating layer was formed on a separator, the layer was formed on either the surface of the separator to be in contact with the positive electrode or the surface of the separator to be in contact with the negative electrode as shown in Table 11.

Battery X58

A battery was produced in the same manner as in Battery X9 except that, instead of aramid resin, polyamide imide resin (with a thermal decomposition temperature of not less than 400° C. and a glass transition temperature of 250° C., amorphous) was used.

Battery X60

A battery was produced in the same manner as in Battery X9 except that the heat-resistant insulating layer was formed on the surface of the separator to be in contact with the negative electrode.

Battery X61

A battery was produced in the same manner as in Battery X58 except that the heat-resistant insulating layer was formed on the surface of the separator to be in contact with the negative electrode.

Battery X62

A battery was produced in the same manner as in Battery Y6 except that a 5 μm thick heat-resistant insulating layer sheet, which was independent of the positive electrode, the negative electrode and the separator, was produced by applying the paste for the heat-resistant insulating layer onto a fluorocarbon resin sheet, which was then dried, and the resulting sheet was peeled, and that the obtained heat-resistant insulating layer sheet was placed between the positive electrode and the separator.

Battery X63

A battery was produced in the same manner as in Battery X62 except that a heat-resistant insulating layer sheet comprising polyamide resin having the same composition as used in Battery X9 was prepared in the same manner as in Battery X62 and was used.

Battery X64

A battery was produced in the same manner as in Battery X62 except that a heat-resistant insulating layer sheet comprising polyamide imide (PAI) resin having the same composition as used in Battery X58 was prepared in the same manner as in Battery X62 and was used.

Battery X65

A battery was produced in the same manner as in Battery X4 except that, as the inorganic oxide filler for the heat-resistant insulating layer, magnesia (magnesium oxide) having a median size of 0.3 μm was used, instead of alumina having a median size of 0.3 μm.

Battery X66

A battery was produced in the same manner as in Battery X56 except that, as the inorganic oxide filler for the heat-resistant insulating layer, magnesia (magnesium oxide) having a median size of 0.3 μm was used, instead of alumina having a median size of 0.3 μm.

The batteries X56 to X66, ten of each, were subjected to the same nail penetration test as in EXPERIMENT 1, and the average of the maximum battery surface temperature of ten batteries was calculated. The results are shown in Table 11.

TABLE 11

| Battery | Positive electrode material used | Material of Heat-resistant insulating layer | Location where heat-resistant insulating layer is formed | Surface with which heat-resistant insulating layer is in contact | Maximum battery surface temperature (° C.) |
|---|---|---|---|---|---|
| X4 | 1 | Alumina | Negative electrode | — | 30 |
| X56 | 1 | Alumina | Positive electrode | — | 43 |
| X57 | 1 | Alumina | Separator | Positive electrode surface | 29 |
| X9 | 1 | Aramid | Separator | Positive electrode surface | 28 |
| X58 | 1 | PAI | Separator | Positive electrode surface | 29 |
| X59 | 1 | Alumina | Separator | Negative electrode surface | 29 |
| X60 | 1 | Aramid | Separator | Negative electrode surface | 29 |
| X61 | 1 | PAI | Separator | Negative electrode surface | 29 |
| X62 | 1 | Alumina | Independent | Positive electrode surface | 49 |
| X63 | 1 | Aramid | Independent | Positive electrode surface | 45 |
| X64 | 1 | PAI | Independent | Positive electrode surface | 46 |
| X65 | 1 | Magnesia | Negative electrode | — | — |
| X66 | 1 | Magnesia | Positive electrode | — | — |

PAI: Polyamide imide

The test results are discussed below.

As can be seen from Table 11, regardless of which material is used to form the heat-resistant insulating layer, the safety in the nail penetration test was improved. This clearly indicates that as long as a material having heat resistance and insulation capability is used, a similar result can be obtained. It is further clear that the effect increases when the heat-resistant insulating layer is formed on the separator or the negative electrode. It is also clear that similar results can be obtained using magnesia, instead of alumina.

In the above examples, cylindrical non-aqueous electrolyte secondary batteries were produced, but it is to be understood that the battery of the present invention is not limited to a cylindrical shape. Similarly, a carbon material was used as the negative electrode active material, and the results when the battery was charged up to the voltage of 4.25 v were shown, even when an Si alloy or Sn alloy is used, the effect of improving safety can be obtained. Also, by using a positive electrode material mixture having an estimated heat generation rate of not greater than 50 W/kg together with the heat-resistant insulating layer, even when the battery is charged to a higher voltage range (4.2 V to 4.6 V), the effect of improving safety can be obtained.

The non-aqueous electrolyte secondary battery of the present invention has a high energy density and a high level of safety, so that it is highly applicable to the power sources for portable devices such as personal digital assistants (PDAs) and mobile electronic devices. However, the lithium secondary battery of the present invention can also be used for, for example, compact home electrical energy storage devices, and the power sources for motorcycles, electric cars and hybrid electric cars, and there is no particular limitation with respect to its use. While there is no particular limitation with respect to the shape of the lithium ion secondary battery of the present invention, a cylindrical shape and a square shape are preferable, for example. The lithium secondary battery of the present invention has high output characteristics, so that it is highly applicable to the power sources for PDAs, electric operated tools, personal computers (PCs), electric operated toys or electric operated robots, and large scale back-up power sources, uninterruptible power supplies (UPS), load leveling power source system utilizing natural energy or regenerative energy utilization system.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising:
    (a) a positive electrode comprising a positive electrode material mixture containing a composite lithium oxide and a positive electrode current collector carrying said positive electrode material mixture;
    (b) a negative electrode comprising a material capable of absorbing and desorbing lithium;
    (c) a separator interposed between said positive electrode and said negative electrode, said separator comprising a polyolefin resin;
    (d) a non-aqueous electrolyte; and
    (e) a heat-resistant insulating layer interposed between said positive electrode and said negative electrode,
    wherein said composite lithium oxide has a composition represented by a general formula (1): $Li_aM_bMe_cO_2$, where element M is at least one selected from the group consisting of Al, Mn, Sn, In, Fe, Cu, Mg, Ti, Zn, Zr and Mo, and element Me is at least one selected from the group consisting of Ni and Co, and where said general formula (1) satisfies:

$0.9 < a < 1.2$;

$0.02 \leq b \leq 0.5$;

$0.5 \leq c \leq 0.98$; and $0.95 \leq b+c \leq 1.05$, wherein said positive electrode and said negative electrode are wound together with said separator and said heat-resistant insulating layer interposed therebetween, and
    wherein said positive electrode material mixture has an estimated heat generation rate at 200° C. of not greater than 50 W/kg.

2. The non-aqueous electrolyte secondary battery in accordance with claim 1,
    wherein said heat-resistant insulating layer has a thickness of 1 μm or more and 15 μm or less.

3. The non-aqueous electrolyte secondary battery in accordance with claim 1,
    wherein said heat-resistant insulating layer has a thickness of 1 μm or more and 5 μm or less.

4. The non-aqueous electrolyte secondary battery in accordance with claim 1,
    wherein said estimated heat generation rate is determined by the steps of:
    (i) determining a relation between absolute temperature T and heat generation rate V of said positive electrode material mixture using an accelerating rate calorimeter (ARC);
    (ii) plotting a relation between the inverse of absolute temperature T as an X coordinate and the logarithm of heat generation rate V as a Y coordinate according to the Arrhenius law;
    (iii) obtaining an approximate straight line fitted to the plotted points in a heat generation temperature range of T<200° C. (473 K); and
    (iv) extrapolating the obtained approximate straight line to the temperature axis at T=200° C. (473 K).

5. The non-aqueous electrolyte secondary battery in accordance with claim 1,
    wherein said element M is distributed in a greater amount in a surface portion of said composite lithium oxide than inside of the surface portion of said composite lithium oxide.

6. The non-aqueous electrolyte secondary battery in accordance with claim 1,
    wherein said composite lithium oxide has been treated with an Si compound represented by a general formula (3): $X-Si-Y_3$,
    where X includes a functional group reactive with said composite lithium oxide, and Y includes a functional group comprising C, H, O, F or Si.

7. A non-aqueous electrolyte secondary battery comprising:
    (a) a positive electrode comprising a positive electrode material mixture containing a composite lithium oxide and a positive electrode current collector carrying said positive electrode material mixture;
    (b) a negative electrode comprising a material capable of absorbing and desorbing lithium;
    (c) a separator interposed between said positive electrode and said negative electrode, said separator comprising a polyolefin resin;

(d) a non-aqueous electrolyte; and
(e) a heat-resistant insulating layer interposed between said positive electrode and said negative electrode,
wherein said composite lithium oxide has a composition represented by a general formula (2): $Li_aM_bNi_dCo_eO_2$, where element M is at least one selected from the group consisting of Al, Mn, Sn, In, Fe, Cu, Mg, Ti, Zn, Zr and Mo, and where said general formula (2) satisfies:

$0.9 < a < 1.2$;

$0.02 \leq b \leq 0.5$;

$0.1 \leq d \leq 0.5$;

$0.1 \leq e \leq 0.5$; and $0.95 \leq b+d+e \leq 1.05$, wherein said positive electrode and said negative electrode are wound together with said separator and said heat-resistant insulating layer interposed therebetween, and
wherein said positive electrode material mixture has an estimated heat generation rate at 200° C. of not greater than 50 W/kg.

8. The non-aqueous electrolyte secondary battery in accordance with claim 7,
wherein said heat-resistant insulating layer has a thickness of 1 μm or more and 15 μm or less.

9. The non-aqueous electrolyte secondary battery in accordance with claim 7,
wherein said heat-resistant insulating layer has a thickness of 1 μm or more and 5 μm or less.

10. The non-aqueous electrolyte secondary battery in accordance with claim 7,
wherein said estimated heat generation rate is determined by the steps of:
(i) determining a relation between absolute temperature T and heat generation rate V of said positive electrode material mixture using an accelerating rate calorimeter (ARC);
(ii) plotting a relation between the inverse of absolute temperature T as an X coordinate and the logarithm of heat generation rate V as a Y coordinate according to the Arrhenius law;
(iii) obtaining an approximate straight line fitted to the plotted points in a heat generation temperature range of T<200° C. (473 K); and
(iv) extrapolating the obtained approximate straight line to the temperature axis at T=200° C. (473 K).

11. The non-aqueous electrolyte secondary battery in accordance with claim 7,
wherein said general formula (2) satisfies:

$0.15 \leq b \leq 0.4$;

$0.3 \leq d \leq 0.5$; and $0.15 \leq e \leq 0.4$.

12. The non-aqueous electrolyte secondary battery in accordance with claim 7,
wherein said element M is distributed in a greater amount in a surface portion of said composite lithium oxide than inside of the surface portion of said composite lithium oxide.

13. The non-aqueous electrolyte secondary battery in accordance with claim 7,
wherein said composite lithium oxide has been treated with an Si compound represented by a general formula (3): X—Si—Y$_3$,
where X includes a functional group reactive with said composite lithium oxide, and Y includes a functional group comprising C, H, O, F or Si.

14. The non-aqueous electrolyte secondary battery in accordance with claim 1, wherein said current collector comprises an aluminum foil.

15. The non-aqueous electrolyte secondary battery in accordance with claim 7, wherein said current collector comprises an aluminum foil.

\* \* \* \* \*